Figure 1:
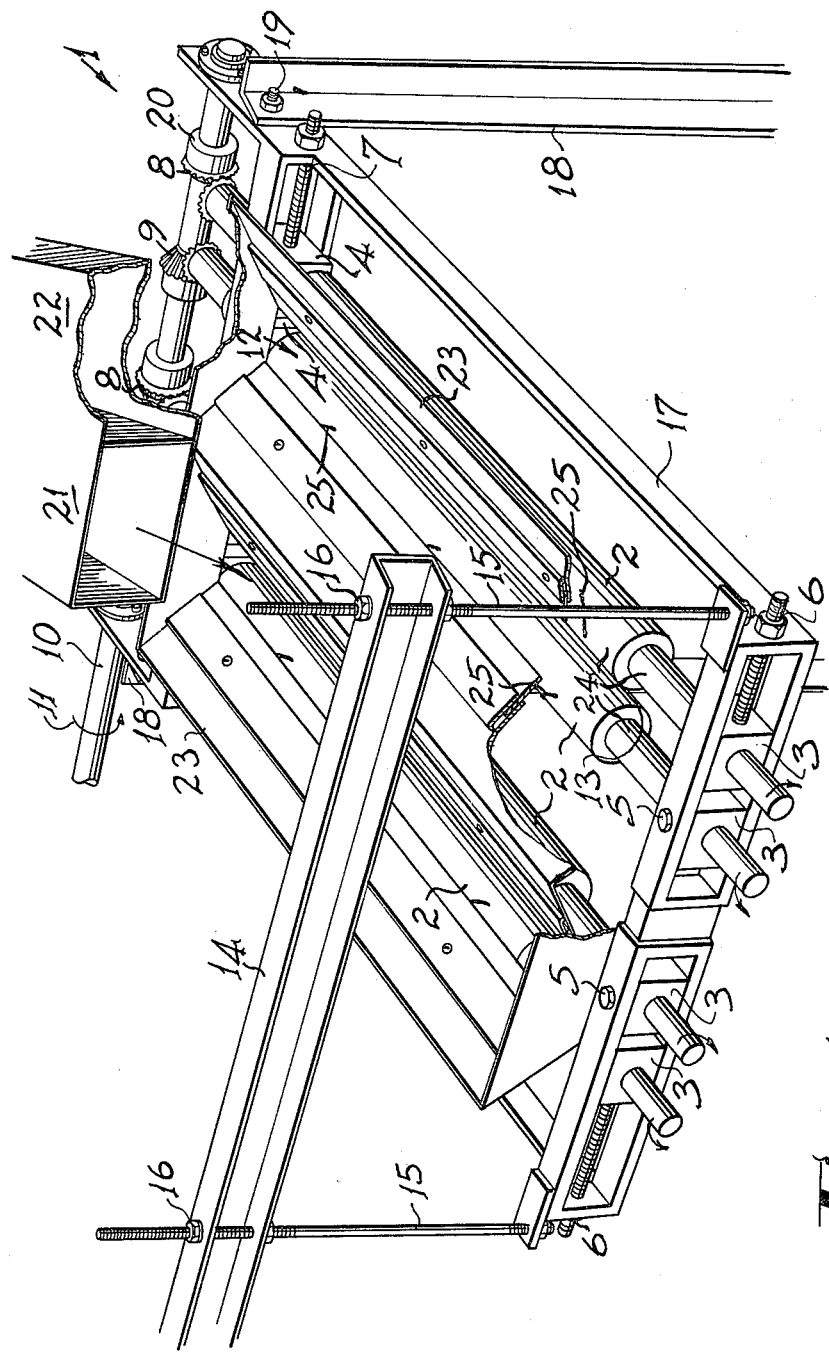

United States Patent [19]

Crompton

[11] 4,347,260
[45] Aug. 31, 1982

[54] METHOD OF SEPARATING ALMOND KERNELS FROM ALMONDS WITH SHELLS

[75] Inventor: Alan W. Crompton, Marryatville, Australia

[73] Assignee: Alf Hannaford & Co. Pty. Limited, Beverley, Australia

[21] Appl. No.: 163,687

[22] Filed: Jun. 27, 1980

[51] Int. Cl.³ .............................................. A23N 5/00
[52] U.S. Cl. ...................................... 426/483; 99/574
[58] Field of Search ....................... 426/481, 482, 483; 99/585, 574, 621, 623, 624, 628; 30/120.2, 120.3, 120.4

[56] References Cited

U.S. PATENT DOCUMENTS

| | | | |
|---|---|---|---|
| 1,126,991 | 2/1915 | Hahn | 426/483 |
| 1,594,702 | 8/1926 | Williams | 426/483 |
| 2,144,841 | 1/1939 | Glaser | 99/574 |
| 3,862,345 | 1/1975 | Westover et al. | 426/481 |

FOREIGN PATENT DOCUMENTS 2547863  5/1977  Fed. Rep. of Germany ...... 426/482

Primary Examiner—Raymond N. Jones
Assistant Examiner—George C. Yeung
Attorney, Agent, or Firm—Oldham, Oldham, Hudak & Weber Co.

[57] ABSTRACT

A method and apparatus for separation of almond kernels where there is a mixture of almond kernels with almond kernels held with or within the shells the method comprising introducing the mixture onto two contra rotating rollers which are rotating upwardly through a separation gap and which have their axis inclined to the horizontal so as to cause feeding of the mixture from an entry location to an exit location, the separation gap being selected so that with the alignment caused by the roller action, almond kernels without shells will pass therethrough while almond kernels with shells will pass along to an exit location. The apparatus provides two contra rotating rollers held the selected distance apart to provide for the separation and being adapted to be contra rotating and includes abutments in the surface to provide an occasional tipping action to almond kernels moving along the surface of the rollers.

3 Claims, 3 Drawing Figures

METHOD OF SEPARATING ALMOND KERNELS FROM ALMONDS WITH SHELLS

This invention relates to a method of separating almonds into apparatus especially suited for this purpose the separation being especially in relation to separation of almond kernels from almond kernels when within or with their shells.

In the commercial separation techniques hitherto used in relation to almonds, it has been a problem of very significant proportion that methods hitherto used have not been effective in separating some types of almonds when these have at least part of their shell still with the kernels and kernels as such.

Typically, pneumatic separation has not been effective because of the very small difference where some of the shell typically almonds having what are termed paper shells in which part of the husk is removed but not all of it are still mixed with kernels.

Pneumatic separation will easily remove separate husks from kernels but hitherto, it has been found that it has been necessary to resort to hand picking to be sure of adequate separation.

It will be appreciated that this is enormously expensive and has added significantly to the cost of almonds as such and the problem has been as to how to effectively separate almond kernels with some husk still held thereto even though a very thin coat and the kernels fully separated.

The problem to which this invention is directed then is the specific difficulty of separating almond kernels from kernels where there is some attachment of shell the problem being accentuated because in some types of almonds, part of the shell being removed leaves a very thin coat which is commercially unacceptable but which has hitherto been found to be extremely difficult to discern mechanically and therefore to propose an effective separation technique therefor.

The invention in one form can be said to reside in a method of separating almond kernels from almond kernels still retained within or with at least a part of their shells, the method being characterised according to this invention in that the mixture of kernels with and without their shells is placed onto apparatus characterised in that there is provided two relatively moving surfaces the two surfaces being adjacent one to the other and each surface being constrained to move in a direction upwardly and outwardly with respect to the other and separated and from the other to an extent at a lower location such as to selectively allow almond kernels without their shells by reason of alignment caused by the upward and outward movement and shape of the two surfaces, to pass there through while restraining but also causing to move along a direction transverse to the direction of movement of each surface, kernels still with shells.

Preferably, because of cost and simplicity, the two rising surfaces are provided by the surfaces of two rollers each of substantially constant cross section along a working length and each held with its rotational longitudinal axis at an equal height one with respect to the other and substantially parallel one with respect to the other with one end being higher than the other so as to provide slight inclination to the horizontal and the method of the invention comprising the steps of placing the mixture of almond kernels with or without their shells on an upper end of the working length of such rollers.

The rollers are of course to provide the action of the surfaces rising and separating, are rotated in a contra direction one with respect to the other with the circumference rising through the separating gap.

Preferably the diameter of each roller is the same and each are of the same length and each is coupled with gearing one with respect to the other so that they rotate at exactly the same speed in the contra direction.

Preferably it has been found that whereas most of the surface of the roller can be essentially smooth, there has been some value in putting an irregularity in the surface which can have the effect of providing an uneven force on the kernels which tends to tip some of the almond kernels especially those held within the shell, and while this can be achieved in many ways, in practice, it has been found best achieved by simply providing a line of weld helically imbedded within the otherwise smooth metal surface of one of the rollers.

The invention can also reside in the apparatus specifically adapted for the purpose described.

Figure 2:
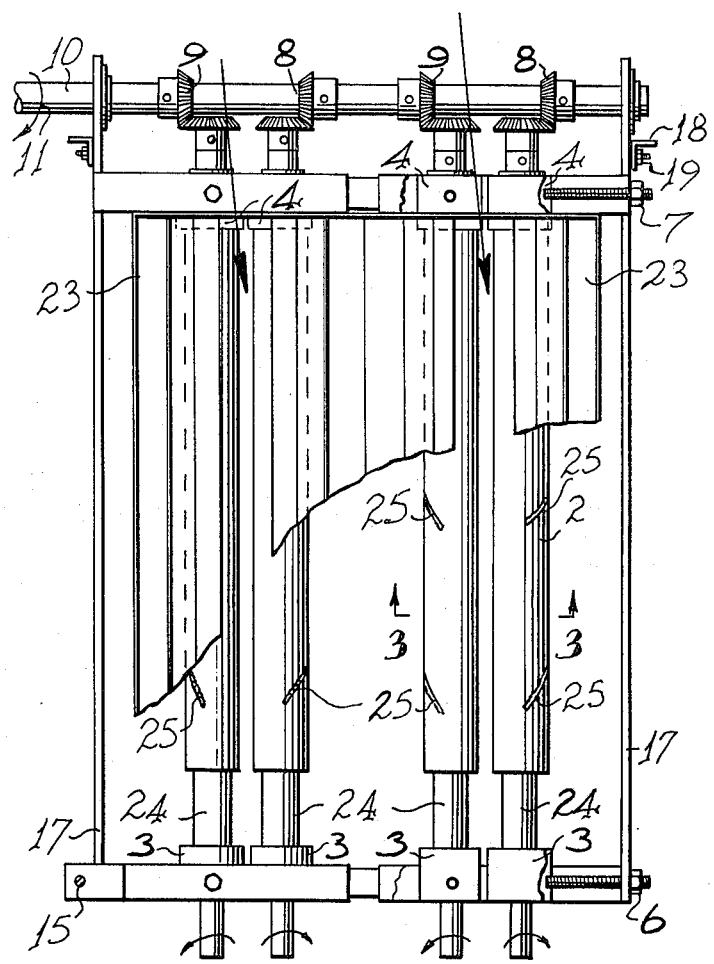
Figure 3:
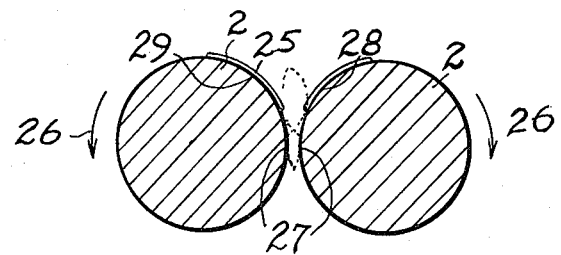

The invention will be better understood with reference to a preferred embodiment which shall be described with the assistance of drawings in which:

FIG. 1 is a perspective view of apparatus according to the preferred embodiment adapted for providing the separation of almond kernels with and without their shells there being shown two separate sets of rollers with the accompanying drive mechanisms and retaining troughs but not showing catching apparatus beneath the rollers, FIG. 2 is a view of the same apparatus as shown in FIG. 1 from above with partly cut away portions and partly sectioned portions and with the supply chutes removed to assist in clarification of the details of the drawing and FIG. 3 is a cross section or view along the lines 33 in FIG. 2 with however only the cross section of the rollers as such shown for the sake of simplicity and there being shown in dotted outline a typical placement of an almond kernel without shell and an almond kernel with shell.

Referring now to the drawings and especially FIGS. 1 and 2, the separation apparatus 1 according to the preferred embodiment incorporates two sets each of two rollers 2 each of which are constrained to rotate within bearing housings 3 and 4 the positions of which are governed by set screw 5 and by screw adjustment means 6 and 7.

The diameter of each of the rollers 2 at least over a working length is constant and each of the diameters is the same that is in this instance, of approximately 10 centimeters.

The gap adjusting means 6 and 7 can thereby set both the actual gap between the closest portion of the rollers which becomes a separating gap because a kernel must pass through this to be in effect separated and the adjustment means 6 and 7 also allow for a slight variation of this separating gap along the length of the rollers 2.

This is very much a question of selection by the operator and very obviously, the different settings will be preferred by different operators although a strictly parallel relationship between the two rollers can achieve effective results and likewise slight inclination of the axis one with respect to the other so as to leave a slightly widening gap from the point of introduction to the end can also provide some advantage in some cases.

Reference accordingly to parallel axis of the rollers therefore means substantially parallel having in mind the necessity or even freedom to vary such gap separation knowing the tolerance that is allowed with respect to the variation of thickness of each almond kernel and this difference as compared to those with shells on.

Clearly in setting up an apparatus of this type some experimentation will be necessary and the purpose of this comment is to emphasise that it is necessary to conduct some experimentation to find the best separation gap in operating the mechanism.

Each of the rollers 2 is constrained to rotate in a direction opposite to its adjacent roller and this is achieved by having each roller constrained by gear coupling connections 8 and 9 whereby upon rotation of shaft 10 in a direction in accord with arrow 11, this will cause each of the rollers 2 to rotate in a contra direction one with respect to the other and provide the upward and outwardly moving surfaces which provide the separating and moving effect for the almonds. To have the almonds that is the mixture of kernels with or without their shells move along the working length of the rollers, it is necessary to have the rollers at an inclined angle to the horizontal that is the end 12 shall be higher than the end 13.

The degree of inclination is adjustable and once again should be controlled by the operator to provide for the particular instance the best result.

In this apparatus there is a support beam 14 supporting through rods 15 which are adjustably secured to the member 14 by bolts 16 the end of frame 17.

The upper end of frame 17 is pivotally supported to a support frame 18 by pivot connection 19.

It has been found that a setting that gives about 10 degrees inclination to the horizontal of the separating gap can be effective.

It is to be noted incidentally that the gear connections 8 and 9 with respect to the rollers 2 can be adjusted in their relative positions with respect to the shaft 10 by reason of adjustment of the position of the gear members 20 along the length of the shaft 10.

The mixture of almond kernels and almond kernels with shells is fed onto the respective rollers by reason of feed chutes 21 and 22 and these are fed onto the top of the rotating rollers 2 and are held in this position by retaining troughs 23.

At a lower end of each of the rollers 2 there is a portion of lesser diameter shown at 24 which will thereby allow materials being carried along above the separating gap to easily pass between the rollers when they reach this location.

It has been found of advantage to provide a change in the smooth surface at some portion along the surface of each of the rollers 2 and while many different ways of providing this can be proposed, it has been found insofar as the rollers have been made from mild steel that an approximate spiral shaped portion of weld rising only several millimeters from the surface is adequate to provide a non-uniform lift to materials being carried above the separating gap and in effect provide a tossing and separating action. These are shown at 25.

This then describes the apparatus as in FIGS. 1 and 2.

Referring now to FIG. 3, there will be seen that this shows two rollers 2 which are rotating in contra directions as shown by the arrows 26 the arrangement then providing a separating gap at 27 and from there above there are two surfaces 28 and 29 which proceed upwardly and outwardly one with respect to the other to thereby leave an effectively "V" shaped area which has the joint effect of providing an aligning effect on almond kernels and almond kernels with shells and with the inclination necessary of perhaps 10 degrees to the horizontal movement of such materials retained above the separating gap and upon alignment being received for almond kernels without shells, the gap 27 being selected so as to allow such kernels once aligned with respect to their narrowest axis to pass therebetween.

In practice, using apparatus as described extremely significant cost savings have been achieved with respect to separation of almond kernels from almonds with shells and in one particular instance, it has achieved a saving of one third of the cost that has hitherto been considered necessary in cracking and separating costs associated in preparing almond kernels for commercial use.

What is claimed is:

1. A method of separating a mixture of almond kernels and almond kernels still retained within at least a part of their shells, the method comprises placing a mixture of said kernels with and without their shells onto two substantially parallel rollers having their axes inclined to the horizontal and having a separation gap therebetween sized to permit passage of almond kernels therethrough, each roller rotating about its longitudinal axis in a direction contra to the other roller such that its circumference rises past the separation gap and proceeds upwardly and outwardly with respect to the surface of the other roller, and moving a mixture of said kernels still with shells into said separation gap in a direction transverse to the direction of movement of each roller, thereby allowing almond kernels without their shells to drop through the said separation gap due to an aligning effect caused by the upward and outward movement of the respective surface of the roller.

2. A method of separating almond kernels from almond kernels still retained within or with at least a part of their shells as in claim 1 in which at least one of the surfaces of the rollers over a working length includes an abrupt change in shape so as to provide a tipping effect with respect to said almond kernels.

3. A method of separating a mixture of almond kernels and almond kernels still retained within or with at least a part of their shells, the method comprises placing a mixture of said kernels onto a pair of support surfaces in which at least one of the support surfaces includes abrupt changes in shape so as to provide a tossing and separating action in respect of almond kernels or almond kernels with shells placed thereon and passing thereby, said support surfaces being provided with relative upward and outward movement and having a separation gap therebetween, said separation gap being sized to permit only almond kernels to drop therethrough, said support surfaces being inclined to the horizontal, and moving said mixture of kernels still with shells into said separation gap in a direction transverse to the direction of movement of each support surface, thereby allowing almond kernels without their shells to drop through the said separation gap due to an aligning effect caused by the upward and outward movement of the respective support surface.

* * * * *